United States Patent Office 3,009,588
Patented Nov. 21, 1961

3,009,588
PRESSURE CONTROL IN SOLIDS
TRANSFER SYSTEMS
John G. Mitchell, Larchmont, N.Y., assignor to Socony
Mobil Oil Company, Inc., a corporation of New York
Filed June 30, 1959, Ser. No. 824,112
2 Claims. (Cl. 214—17)

This invention relates to the transfer of particle-form material from a zone at one pressure to a zone at a substantially different pressure. It is particularly concerned with hydrocarbon conversion processes in which a granular contact material or catalyst is moved continuously through zones maintained at substantially different pressures.

Many known processes use particle-form solid material conveyed or passed through gas-solids contacting vessels as catalytic material, heat transfer material, etc. Typical of such processes is the moving bed hydrocarbon conversion process in which a granular particulate material is passed as a gravitating compact bed through a reaction zone where it is contacted with hydrocarbons properly prepared for treatment and then through a regeneration zone as a compact gravitating bed where it is contacted with air to burn carbonaceous contaminant from the material and render the material in proper condition and at proper temperature for reuse in the reactor. The reactor is maintained at elevated pressures such as 10–100 p.s.i. (gauge) or more. The regenerator is generally maintained at atmospheric pressure as a safety precaution as well as convenience in handling the large volumes of air involved. The reactor may be at a temperature of 800–1000° F. whereas the regenerator or kiln may be at temperatures of the order of 900–1400° F.

The contact material may be a synthetic material such as silica, alumina, chromia, zirconia or combinations of these and other materials in the form of pellets, pills, balls or irregular-shaped granular particles. The size may range over a wide range, depending upon the particular process involved. Many processes use particles of about 3–100 mesh Tyler. For instance, the TCC process for cracking hydrocarbons utilizes a size range of about 4–12 mesh Tyler. Since the TCC is a cracking process a cracking catalytic material, generally silica-alumina-chromia, is used. A variety of natural or treated clays are also used in these processes, such as bentonite, kaolin and montmorillonite.

It has always been a problem in these processes to transfer the contact material between the zones at different pressure without damaging the contact material. Valves, pressuring chambers and mechanical feeders of all types have been considered but are found unsatisfactory. This is particularly true in the TCC process since it is essential to prevent the formation of fine particles caused by attrition or breakage of the catalyst. These fine particles interfere with the uniform flow of gas through the compact beds and are for this reason as well as others highly undesirable. Mechanical valves and flow control apparatus have been found to cause excessive attrition and breakage and hence are not generally used.

In order to introduce catalyst into the high pressure reactor of the TCC process, an elongated gravity feed leg is provided above the reactor and the material is gravitated continuously through this leg to gradually build up the pressure to reactor pressure. The catalyst feeds smoothly and continuously into the reactor as long as the leg has sufficient length to overcome the pressure differential. Unfortunately, the scheme requires about 4–5 feet of leg for each pound of pressure differential and hence is only practical for modest pressure differentials, such as about 10 p.s.i. In order to feed catalyst into a reactor maintained at 50 p.s.i. (gauge) the leg would have to be 250 feet tall and this is impractical. It is undesirable to have this limitation on reactor pressure and hence considerable work has been done over recent years to provide a way of introducing contact material or catalyst into a reactor at elevated pressure which would not require the tall structure required by the gravity feed leg but which would, like the gravity feed leg, permit movement of catalyst into or out of a high pressure vessel without mechanical sealing or flow interrupting devices which damage the catalyst and wear rapidly because of the abrasive action of the catalyst.

The object of this invention is to provide a method or apparatus for transferring a particle-form solid material through regions of different pressure with minimum damage.

A further object of this invention is to provide a method or apparatus for introducing or withdrawing contact particles from a high pressure vessel with minimum damage to the contact particles and transfer system.

A further object of this invention is to provide a method or apparatus for introducing a granular catalyst into a high pressure reactor which works smoothly without valves or baffles in the catalyst line and does not require excessive elevation.

A further object of this invention is to provide a method and apparatus for continuous introduction or withdrawal of particle-form solid material from a high pressure region while maintaining a gas seal to prevent the escape of gas from the high pressure region.

These and other objects will be clearly understood from a study of the attached figures and a review of the following detailed discussion of the invention which refers from time to time to these figures.

In one aspect, this invention involves the downward transfer of granular material through a passage which terminates within a chamber below a level of liquid having a density substantially greater than the granular material by the continuous concurrent flow of a stream of the liquid. Within the chamber the material rises and is lifted out of the liquid by the substantial density differential to a discharge outlet from said chamber. The liquid is withdrawn from the lower portion of the chamber substantially below the lowest level to which the granular material penetrates in the chamber and pumped back to the passage for reuse. The level of granular material in the chamber is continuously observed and the flow rate of the circulating heavy liquid is controlled in accordance with this measurement to insure that particles do not penetrate in the liquid below a predetermined level.

Figure 1:
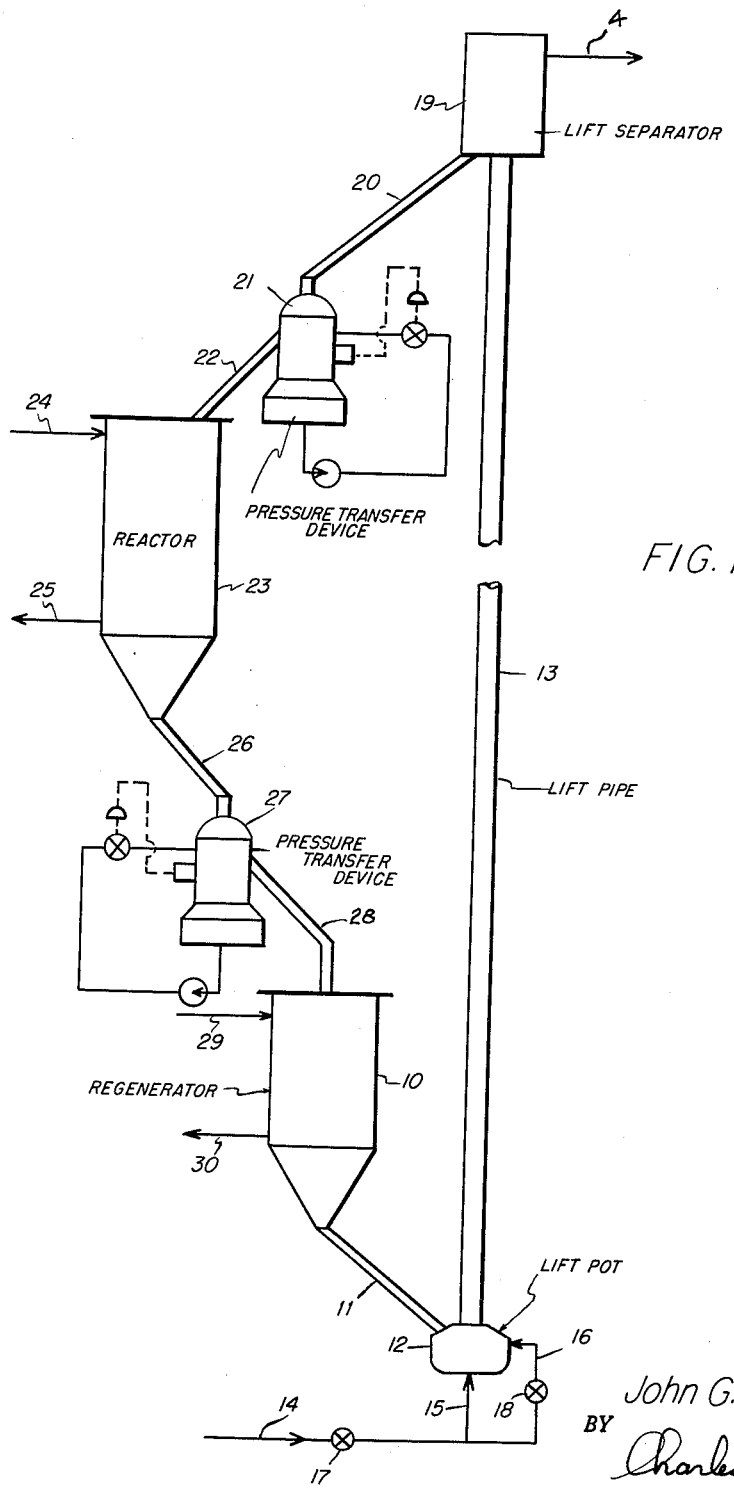
FIGURE 1 is a highly diagrammatic representation of a moving bed hydrocarbon conversion system, such as a TCC system.

In order to illustrate the invention, it will be disclosed in relation to a continuous moving bed process for cracking hydrocarbons, it being understood that the invention will have broad application to related processes where similar solids movement problems are involved. Referring now to FIGURE 1, a granular cracking catalyst is removed from the regenerator 10 through a conduit 11 and introduced into a lift pot 12 for elevation through a pneumatic lift 13. A lift gas is introduced into the lift pot through conduits 14, 15 and 16, the flow rate being adjusted by the valves 17 and 18 to provide the desired catalyst flow through the lift pipe 13. The lift gas and catalyst is separated in the lift separator 19, the gas being discharged through the conduit 4 to the atmosphere.

The separated catalyst is gravitated through the conduit 20 into the pressure transfer device 21 and through the conduit 22 into the reactor 23. The catalyst is contacted in the reactor 23 with hydrocarbons which are introduced through the conduit 24 and products formed thereby are withdrawn through the conduit 25. The spent catalyst is withdrawn from the reactor through the conduit 26 into the pressure transfer device 27 and through the conduit 28 into the regenerator 10.

The catalyst is gravitated as a compact mass through the regenerator where it is contacted with air introduced into the vessel through the conduit 29. The contaminant is burned from the catalyst and the flue gas formed thereby is withdrawn through the conduit 30.

Figure 2:
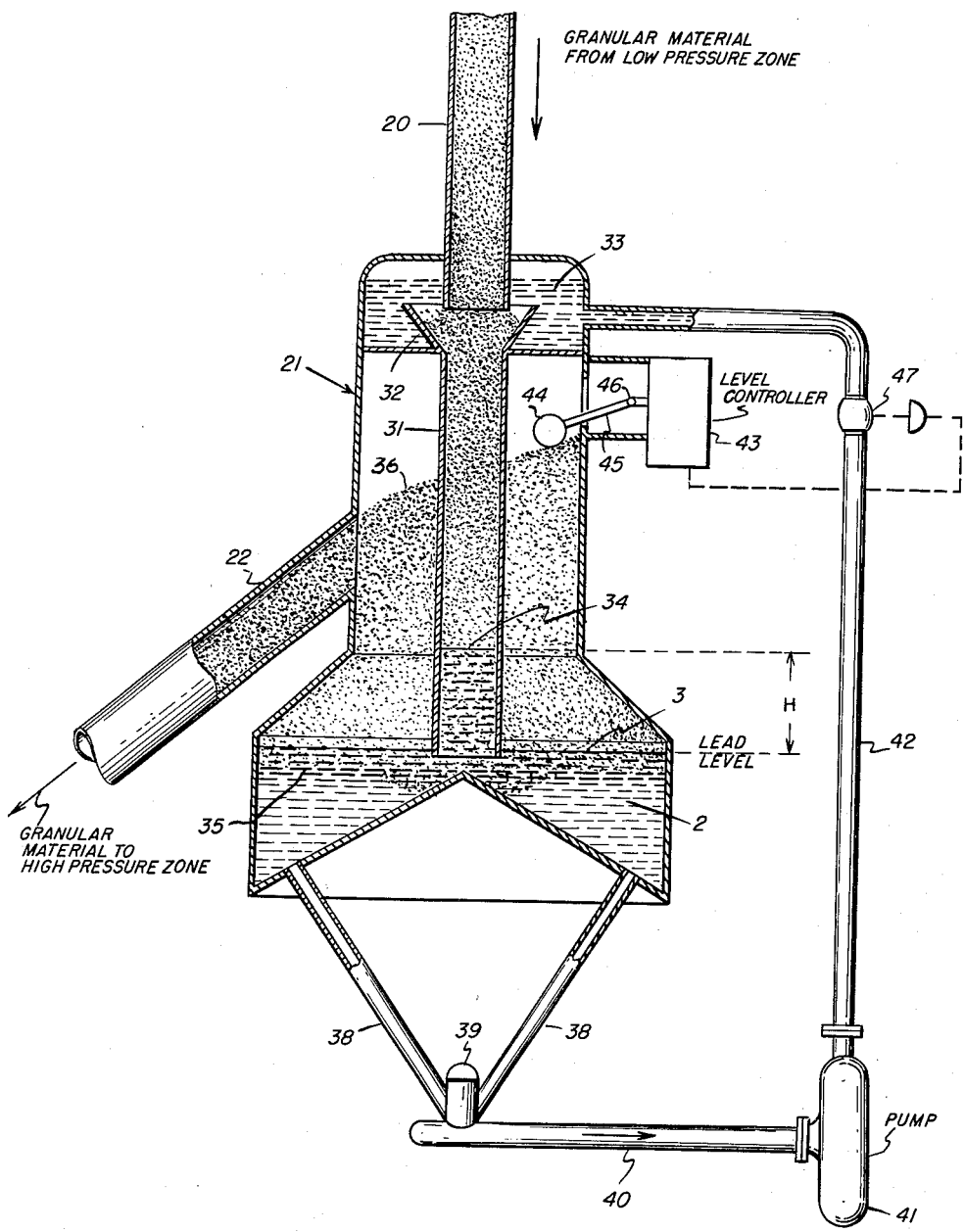
FIGURE 2 is an elevation in vertical section of the pressure-control apparatus of this invention used to introduce granular material into a high pressure zone.

Referring now to FIGURE 2, the pressure transfer device 21 is shown in more detail. The conduit 20 projects downwardly into the vessel 21 and communicates directly with an aligned vertical passageway 31 of substantially the same cross-section. An inverted frusto-conical baffle 32 is attached at the upper end of passageway 31 to form a receptacle for the granular contact material and permit the introduction at that point of the heavy liquid from the enclosed chamber 33. The feasibility of admixing heavy liquid with contact catalyst has been previously demonstrated in U.S. Patents 2,268,535; 2,357,694; 2,370,950; 2,453,458; and 2,547,015. Suitable liquids are molten lead, mercury, tin, and molten alloys are found satisfactory. The heavy liquid travels concurrently with the granular material or catalyst through the passageway 31 to the lower end thereof at a flow rate sufficient to carry the catalyst into the liquid pool 2 at the bottom of the vessel 21. The liquid level is shown at 3 in the vessel 21 but within the passageway 31 this level is indicated by 34 at a substantially higher elevation. This is brought about by the substantial pressure differential between the inlet and outlet of the vessel 21. It is seen that the particles penetrate the liquid to a level 35 and are lifted upwardly therefrom by the substantial differential in density between the heavy liquid and the solids. The solids rise as a compact mass out of the liquid to a level 36 and flow from that level laterally at an angle of repose of about 30° with the horizontal to a discharge pipe 22. The particles travel in compact flowing form through the conduit 22 to the high pressure vessel, such as the reactor in the TCC process.

The molten liquid is withdrawn through conduits 38 which are attached to the bottom of vessel 21 at a level substantially below the level 35 to which the particles penetrate. By this arrangement only liquid is withdrawn through the conduits 38. This liquid is combined in chamber 39 and drawn through conduit 40 by the pump 41. The liquid is pumped upwardly through the conduit 42 to the chamber 33. A level controller 43 is indicated diagrammatically in the form of a float 44 on arm 45 and pivot 46. The float 44 rides on the catalyst surface in the vessel and the level controller is connected to valve 47 to adjust the flow rate of the liquid to maintain the catalyst level at level 36 regardless of the withdrawal rate of catalyst through conduit 22. The rate of catalyst flow through pressure transfer device 21 is governed by the pneumatic lift control valves 17 and 18 shown on FIGURE 1. If the catalyst circulation rate of the system changes, level controller 43 through control valve 47 adjusts the rate of circulating liquid so that the level of catalyst 36 is maintained. If the catalyst level control did not exist, catalyst could flow into the transfer device at a greater rate than it is withdrawn through conduit 22. This would cause catalyst level 36 to rise, filling the catalyst surge space above level 36 and the catalyst would be forced to penetrate deeper into the liquid and eventually be withdrawn through conduits 38. This has been found highly objectionable because the solid catalyst particles are highly abrasive and cause serious damage to the pump 41 and valve 47. Obviously, alternate level-indicating means could be provided to automatically operate valve 47. Furthermore, this control could be applied to the motor of pump 41 and such alternate arrangements are contemplated.

Figure 3:
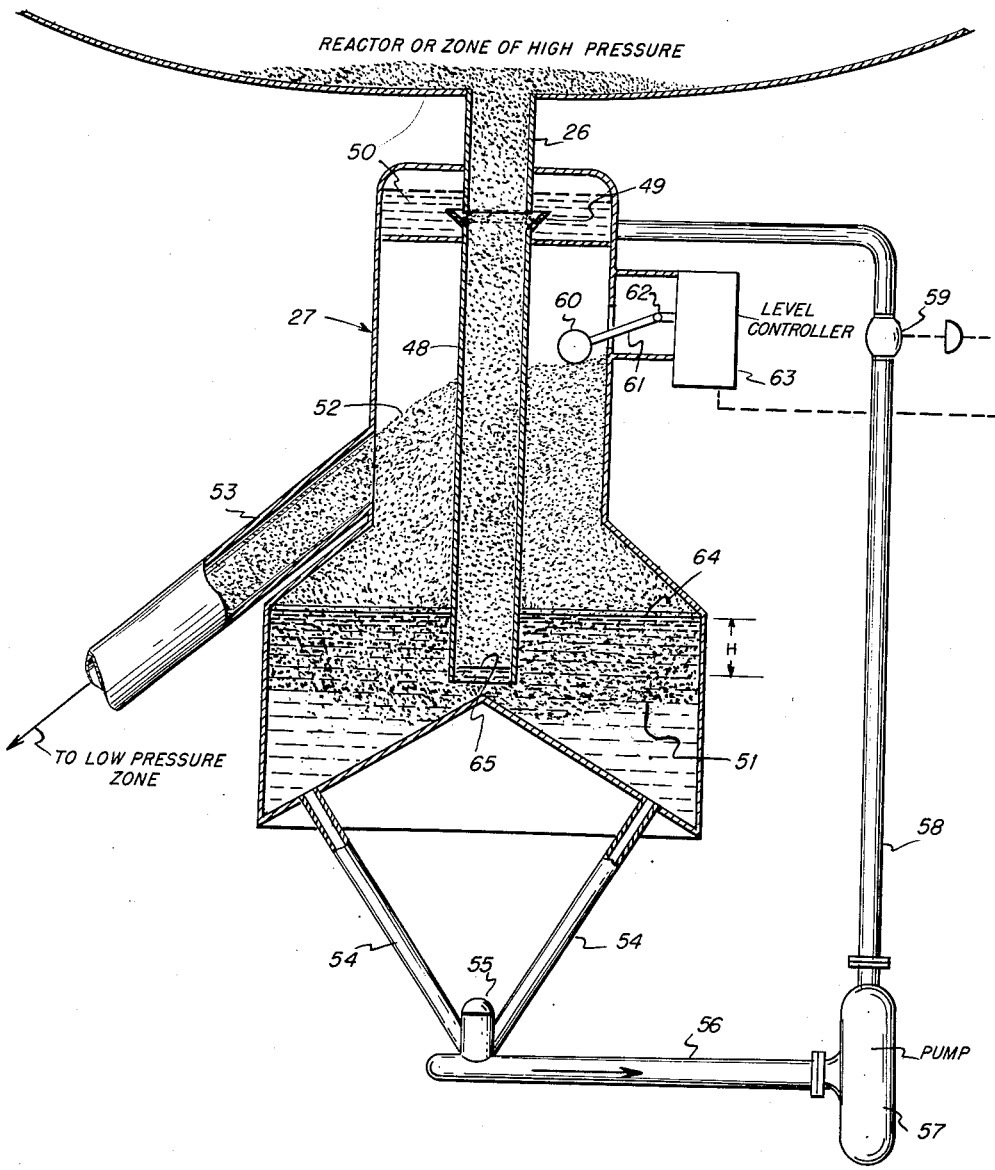
FIGURE 3 is an elevation in vertical section of the pressure-control apparatus of this invention used to withdraw granular material from a high pressure zone.

Referring now to FIGURE 3, an alternate arrangement is shown for transferring solids from a high pressure reaction zone to a low pressure zone. The conduit 26 is projected into the top of the vessel 27 and transmits solid material in compact form to the passageway 48 located below and in alignment with the conduit 26. The inverted frusto-conical baffle 49 allows liquid from the chamber 50 to enter the catalyst column for concurrent flow with the catalyst through the passageway 48. The particles are introduced into the liquid in the bottom of the vessel 27 as a result of the liquid flow and the particles penetrate to a level 51. The particles are forced upwardly in the vessel 27 as a result of the substantial difference in density between the liquid and solids and rise to a level, such as level 52, from which the particles can flow by gravity through conduit 53 to the low pressure zone. The liquid is withdrawn through the conduits 54 attached to the bottom of the vessel 27 at a level substantially below the level 51 and hence liquid, free of particles, is withdrawn. This liquid is combined in chamber 55 and drawn through conduit 56 into pump 57. The liquid is elevated through conduit 58 to the chamber 50 and the flow rate of liquid return is controlled by the valve 59. The level float 60 operates crank 61 on pivot 62 to indicate catalyst level to the controller 63, which in turn controls valve 59 so as to maintain the catalyst level substantially constant. The liquid level 64 in the vessel 27 is substantially higher than the liquid level 65 in the passageway 48 as a result of the pressure differential between the two zones, the differential H in this embodiment being reversed to that shown on FIGURE 2.

It is seen from the detailed description of the invention that any type of granular material may be transferred to or from a low or high pressure region employing a high density circulating seal liquid. This type of seal is operable across a high pressure differential at a minimum loss of height to the unit, with no dilution of the high and low pressure zones from seal gas as occurs with the conventional gravity or pressure gradient type seal leg. The high density liquid can be mercury or an alloy of lead, bismuth, tin and cadmium which can have a minimum melting point of 149° F. and a minimum density of 600 lbs./cu. ft. This type of seal liquid is non-wetting to the particles it contacts because of its high surface tension and cohesive property and can maintain a seal at minimum seal height H because of its high density. The seal liquid is pumped at a controlled rate so that the velocity of the liquid relative to the flowing particles creates a downward drag on the particles overcoming the force of buoyancy of the liquid on the submerged particles.

The particles, upon leaving the passageway within the liquid bath, buoy to the surface unwetted and rise a considerable distance above the surface of the seal liquid due to the buoyant force on the submerged particles in the liquid bath. The disengagement zone is made large enough in cross-section so that the velocity of the seal liquid down towards the outlets to the pump is low enough so that its downward drag on the particles is less than the force of buoyancy of the liquid on the particles. The particles will therefore buoy from the surface of the liquid and will not be dragged down into the pump. The buoyed particles are drained from the top of the buoyed column to the high or low pressure zone as desired. In order to control the rate of flow of particles through the seal when the withdrawal of particles is reduced or stopped, a measuring means such as the float system previously described is used to control liquid circulation. This is exceedingly important in preventing migration of particles through the pump system. Prior heavy liquid seal systems failed because of pump wear or breakdown caused by particle entrainment or failed because of the failure of poor catalyst handling devices used in moving the catalyst through pressure seal zones.

*Example 1*

The invention is illustrated in conjunction with a moving bed system circulating 500 tons per hour of silica-alumina-chromia catalyst of 4–12 mesh Tyler screen analysis. The loose density of the catalyst is about 43 lbs./ft.$^3$ with 50% void space. The catalyst is transferred to the reactor at about 875° F. and passed through a liquid seal device similar to that shown on FIGURE 2. The passageway 20 was 1 ft. 11 inches in diameter to handle this catalyst flow, the lower portion of the vessel 21 was 10 ft. 0 inches in diameter, and the overall height of vessel 21 was 21 ft. Molten lead was selected as the high density liquid with a density of 650 lbs./ft.$^3$ and the circulation being about 1545 gallons per minute to insure desired catalyst circulation. For a reactor pressure of 45 p.s.i., the differential height H was about 13.5 feet. In the 10 ft. 0 inch lead-catalyst disengagement zone the velocity of the catalyst up, relative to the flow of lead down toward the pump, was about .170 ft./sec. This low relative velocity allows the lead to buoy up from the downward flowing lead and prevents entrainment of the catalyst to the pump 41. The catalyst buoyed up 6.5 ft. (level 36 to 3) for a 1 ft. catalyst penetration of the lead (level 3 to 35).

The examples and embodiments of the invention given hereinabove are not intended to limit the invention but are provided solely to illustrate the invention. The only limitations intended are found in the attached claims.

I claim:

1. An appartus for continuously transferring particle-form material between zones of substantially different pressure which comprises in combination: a chamber containing in the lower portion thereof a level of heavy liquid, a passageway for introducing particle-form material into said chamber projected downwardly into said chamber and terminated below the liquid level in said chamber but substantially above the lowest level of said chamber, means for withdrawing liquid from said chamber attached to the bottom thereof and at a level substantially below the end of said passageway, the density of the heavy liquid being substantially greater than the density of the particle-form material, whereby the particle-form material rises within said chamber at a level substantially above the level at which said liquid is withdrawn, an outlet conduit attached to said chamber at a level substantially above the level at which said liquid is maintained, adapted to remove particle-form material from said chamber, return conduit means for conveying the withdrawn liquid from the bottom of said chamber to the passageway at a level above the bottom thereof, pumping means within said return conduit means for circulating the liquid, level-indicating means within said chamber to indicate the level of particle-form material and means associated with said level-indicating means adapted to control the flow rate of liquid in said return conduit means whereby the level of particle-form material in said chamber is maintained at a substantially constant level and whereby said material is prevented from migrating to the liquid outlet in said chamber so that liquid free from particle-form material is transferred through said return conduit means.

2. Claim 1 further characterized in that said particle-form material is granular catalyst and said liquid is molten lead.

References Cited in the file of this patent

UNITED STATES PATENTS

| | | |
|---|---|---|
| 1,971,716 | Hitchcock | Aug. 28, 1934 |
| 2,505,194 | Loss | Apr. 25, 1950 |
| 2,529,583 | Adams | Nov. 14, 1950 |
| 2,571,277 | Morrow | Oct. 16, 1951 |